(12) United States Patent
Yamakami et al.

(10) Patent No.: US 10,427,249 B2
(45) Date of Patent: Oct. 1, 2019

(54) FLUX-CORED WIRE FOR GAS-SHIELDED ARC WELDING

(71) Applicant: Kobe Steel, Ltd., Kobe-shi (JP)

(72) Inventors: Masafumi Yamakami, Kanagawa (JP); Masayuki Nagami, Kanagawa (JP); Yoshihiko Kitagawa, Kanagawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/755,871

(22) PCT Filed: Aug. 25, 2016

(86) PCT No.: PCT/JP2016/074777
§ 371 (c)(1),
(2) Date: Feb. 27, 2018

(87) PCT Pub. No.: WO2017/038610
PCT Pub. Date: Mar. 9, 2017

(65) Prior Publication Data
US 2018/0339370 A1  Nov. 29, 2018

(30) Foreign Application Priority Data

Aug. 28, 2015 (JP) ................. 2015-169350

(51) Int. Cl.
*B23K 35/30* (2006.01)
*B23K 35/368* (2006.01)
(Continued)

(52) U.S. Cl.
CPC ............ *B23K 35/0266* (2013.01); *B23K 9/16* (2013.01); *B23K 35/30* (2013.01);
(Continued)

(58) Field of Classification Search
CPC ........ B23K 35/30; B23K 35/368; B23K 9/16; B23K 35/0266; B23K 35/3073; B23K 35/3608; C22C 38/00; C22C 38/46
(Continued)

(56) References Cited

U.S. PATENT DOCUMENTS 6,140,607 A   10/2000  Kamada et al.
2006/0261053 A1  11/2006  Karogal
(Continued)

FOREIGN PATENT DOCUMENTS

EP   2 374 571 A1   10/2011
JP   07-251294 A    10/1995
(Continued)

OTHER PUBLICATIONS

Extended European Search Report dated Dec. 11, 2018 in corresponding European Patent Application No. 16841642.8, 8 pages.
(Continued)

*Primary Examiner* — Dana Ross
*Assistant Examiner* — Joe E Mills, Jr.
(74) *Attorney, Agent, or Firm* — Oblon, McClelland, Maier & Neustadt, L.L.P.

(57) ABSTRACT

Provided is a flux-cored wire for gas-shielded arc welding that contains, per wire total mass, specific amounts of C, Mn, $TiO_2$ and specific amounts or less of P and S, and contains, in the flux, a specific amount of Ni per wire total mass. The Ni has a ratio ($\alpha 1/\alpha 2$) of 0.50-1.00 when $\alpha 1$ (mass %) is the content per wire total mass of particles having a size of 106 μm or less and $\alpha 2$ (mass %) is the content per wire total mass of particles having a size exceeding 106 μm.

10 Claims, 1 Drawing Sheet

(51) Int. Cl.
*B23K 9/16* (2006.01)
*B23K 35/36* (2006.01)
*C22C 38/00* (2006.01)
*C22C 38/04* (2006.01)
*B23K 35/02* (2006.01)

(52) U.S. Cl.
CPC ........ *B23K 35/3073* (2013.01); *B23K 35/368* (2013.01); *B23K 35/3608* (2013.01); *C22C 38/00* (2013.01); *C22C 38/04* (2013.01)

(58) Field of Classification Search
USPC .................................................... 219/145.22
See application file for complete search history.

(56) References Cited

U.S. PATENT DOCUMENTS

| | | | | |
|---|---|---|---|---|
| 2008/0093352 | A1* | 4/2008 | Jang | B23K 35/0266 219/145.22 |
| 2009/0261085 | A1* | 10/2009 | Suzuki | B23K 9/173 219/137 PS |
| 2015/0314397 | A1 | 11/2015 | Jeong et al. | |
| 2016/0368103 | A1* | 12/2016 | Shearer | B23K 35/26 |

FOREIGN PATENT DOCUMENTS

| | | |
|---|---|---|
| JP | 10-58189 A | 3/1998 |
| JP | 11-179590 A | 7/1999 |
| JP | 11-300493 A | 11/1999 |
| JP | 2000-301381 A | 10/2000 |
| JP | 2012-143809 A | 8/2012 |
| JP | 2013-18012 A | 1/2013 |
| JP | 2013-184204 A | 9/2013 |
| WO | WO 2014/104731 A1 | 7/2014 |

OTHER PUBLICATIONS

Decision to Grant a Patent dated Aug. 7, 2018, in Japanese Patent Application No. 2015-169350 (filed Aug. 28, 2015 (with English translation).

International Search Report dated Sep. 27, 2016 in PCT/JP2016/074777 filed Aug. 25, 2016.

* cited by examiner

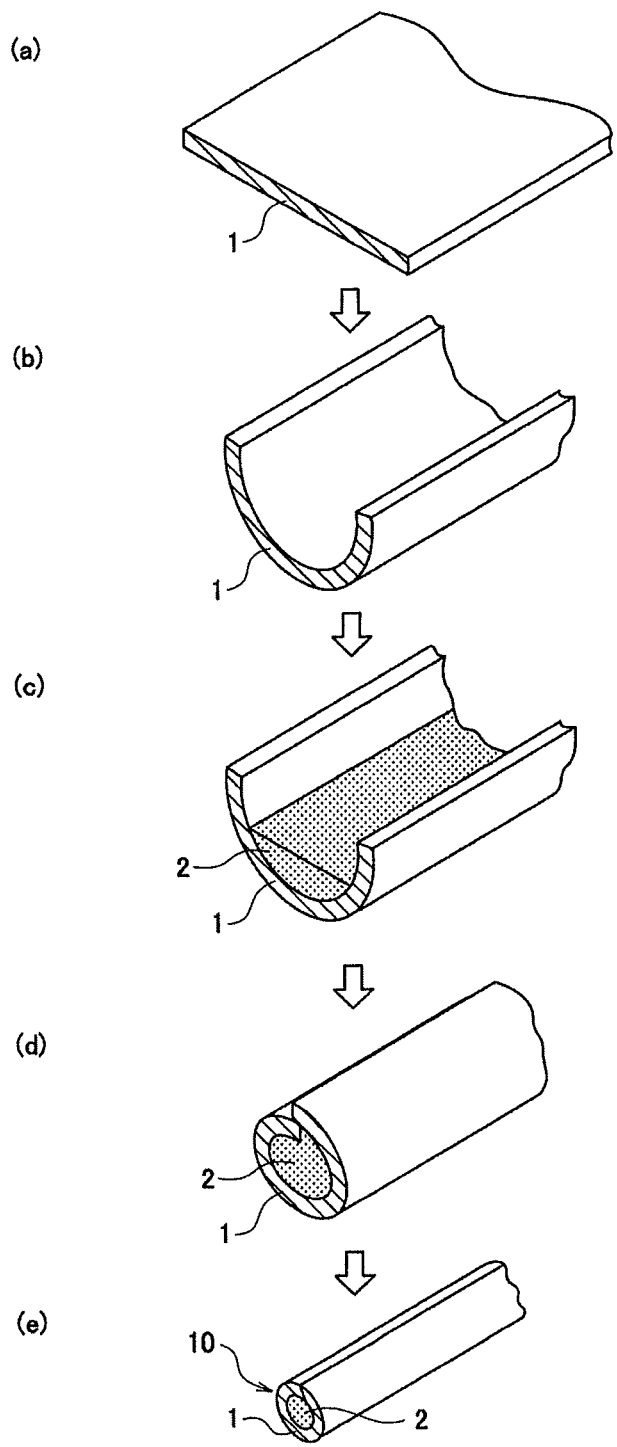

FLUX-CORED WIRE FOR GAS-SHIELDED ARC WELDING

TECHNICAL FIELD

The present invention relates to a flux-cored wire for gas-shielded arc welding. More specifically, the present invention relates to a flux-cored wire for gas shielded arc welding for all-position welding.

BACKGROUND ART

In the field of offshore structures or in the field of line pipes, there is an ongoing trend of advancing development of energy resources in very deep waters, expanding resource exploration/mining zone to an extreme sea area such as Arctic sea, and growing in the equipment size. Against this background of technical trend, the offshore structure or line pipe design is progressing to achieve high strength and high toughness, and more stringent requirements are imposed on the performance of the weld joint.

On the other hand, as for the welding material, a flux-cored wire for all-position welding is demanded in view of higher efficiency. In addition, high fracture toughness is also required for the weld metal obtained.

However, a conventional flux-cored wire for all-position welding forms a weld metal having a high oxygen amount and therefore, when gas-shielded arc welding is performed using the wire, it is difficult to ensure low-temperature toughness of the weld joint part.

Then, for example, Patent Document 1 discloses a flux-cored wire which can be used for highly efficient welding in all positions and can form a low-oxygen and low-hydrogen weld metal having excellent low-temperature toughness and cracking resistance.

CITATION LIST

Patent Document

Patent Document 1: JP-A-2013-18012

SUMMARY OF INVENTION

Technical Problems

However, in the technique disclosed in Patent Document 1, hot cracking when assuming welding in an offshore structure or one-side welding of a pipe is not taken into account. Accordingly, the conventional flux-cored wire has a problem for obtaining a weld metal having excellent hot cracking resistance, in addition to low-temperature toughness and cold cracking resistance. In addition, as for the flux-cored wire, it is also necessary to obtain good weld metal excellent in welding workability and also excellent in mechanical properties, defect resistance, etc.

To cope with the problem or requirement above, an object of the present invention is to provide a flux-cored wire for gas-shielded arc welding, with which a weld metal excellent in welding workability, cold cracking resistance, low-temperature toughness, mechanical properties and defect resistance and also excellent in hot cracking resistance is formed in all-position welding.

The welding workability as used in the present application indicates wettability and good/poor bead shape (including arc stability). The mechanical properties as used in the present application indicate 0.2% yield strength and tensile strength, in addition to low-temperature toughness. The defect resistance as used in the present application indicates blow-hole resistance.

Solution to Problems

In order to solve the above problem(s), the present invention provides the following technical means.

The flux-cored wire for gas-shielded arc welding in the present invention has a steel outer sheath filled with a flux, and the flux-cored wire includes, relative to a total mass of the wire: C: 0.01 mass % or more and 0.20 mass % or less; Mn: 0.5 mass % or more and 5.0 mass % or less; $TiO_2$: 2.0 mass % or more and 10.0 mass % or less; and P: 0.050 mass % or less, S: 0.050 mass % or less, the flux includes, relative to the total mass of the wire, Ni: 0.10 mass % or more and 5.00 mass % or less, and with respect to the Ni, a value of a ratio $\alpha1/\alpha2$ is 0.50 or more and 1.00 or less, wherein $\alpha1$ (mass %) is a content of a particle having a particle size of 106 μm or less relative to the total mass of the wire, and $\alpha2$ (mass %) is a content of a particle having a particle size of more than 106 μm relative to the total mass of the wire.

According to such a configuration, in a flux-cored wire for gas-shielded arc welding (hereinafter, sometimes referred to as a flux-cored wire or simply as a wire), the contents of predetermined elements are specified, whereby the strength and toughness of the weld metal are enhanced.

In addition, the amount of Ni transferred to the weld metal during a melting process is properly controlled, and the diffusible hydrogen content is decreased, by specifying the value of the particle size ratio ($\alpha1/\alpha2$) as the ratio of Ni particle sizes.

The flux-cored wire for gas-shielded arc welding in the present invention preferably further includes at least one of the following (a) to (i):

(a) relative to the total mass of the wire, at least one of Si and an Si oxide: 0.05 mass % or more and 1.00 mass % or less in total in terms of Si;

(b) relative to the total mass of the wire, at least one of Cr: 0.50 mass % or less, Cu: 0.50 mass % or less, and Mo: 0.50 mass % or less;

(c) relative to the total mass of the wire, metal Mg and an Mg alloy: 0.10 mass % or more and 1.20 mass % or less in total in terms of Mg;

(d) relative to the total mass of the wire, metal Ti and a Ti alloy: 0.80 mass % or less in total in terms of Ti;

(e) relative to the total mass of the wire, B and a B compound: 0.0010 mass % or more and 0.0200 mass % or less in total in terms of B;

(f) relative to the total mass of the wire, an F compound: 0.01 mass % or more and 0.50 mass % or less in total in terms of F, and a sum of a total in terms of Na of an Na compound and a total in terms of K of a K compound: 0.01 mass % or more and 1.00 mass % or less;

(g) relative to the total mass of the wire, at least one of Nb: 0.10 mass % or less and V: 0.10 mass % or less;

(h) relative to the total mass of the wire, $ZrO_2$: 0.50 mass % or less and $Al_2O_3$: 0.05 mass % or more and 1.00 mass % or less; and (i) relative to the total mass of the wire, Fe: 75.00 mass % or more.

According to the above configuration (a), the viscosity of molten pool decreases, and the fluidity of molten slag increases.

According to the above configuration (b), the strength of the weld metal is enhanced.

According to the above configuration (c), the deoxidizing action is promoted.

According to the above configuration (d), the toughness of the weld metal is enhanced.

According to the above configuration (e), the toughness of the weld metal is enhanced.

According to the above configuration (f), the diffusible hydrogen content in the weld metal is reduced, and the arc is stabilized.

According to the above configuration (g), the toughness of the weld metal is enhanced.

According to the above configuration (h), the bead shape of the weld metal is improved.

According to the above configuration (i), the flux-cored wire provides a further sufficient deposition amount and therefore, more excellent welding workability is achieved.

Advantageous Effects of Invention

With the flux-cored wire for gas-shielded arc welding of the present invention, a weld metal excellent in welding workability, cold cracking resistance, low-temperature toughness, mechanical properties and defect resistance and also excellent in hot cracking resistance can be obtained.

BRIEF DESCRIPTION OF THE DRAWINGS

[FIG. 1] (a) to (e) are schematic diagrams for describing some steps in the production method of a flux-cored wire.

DESCRIPTION OF EMBODIMENTS

Embodiments for carrying out the present invention is described in detail below. In the flux-cored wire of this embodiment, a steel outer sheath of soft steel is filled with a flux. In the flux-cored wire, C, Mn and $TiO_2$ are contained in predetermined amounts relative to the total mass of the wire, and the content of each of P and S is equal to or less than the predetermined amount. In addition, Ni is contained in the flux in a predetermined amount relative to the total mass of the wire. In the flux-cored wire, with respect to Ni, when the content of a particle having a particle size of 106 μm or less relative to the total mass of the wire is denoted by $\alpha 1$ (mass %) and the content of a particle having a particle size of more than 106 μm relative to the total mass of the wire is denoted by $\alpha 2$ (mass %), the value of the ratio $\alpha 1/\alpha 2$ is specified.

The flux-cored wire preferably further contains at least one of Si and an Si oxide in a predetermined total amount in terms of Si relative to the total mass of the wire. In addition, the flux-cored wire preferably further contains at least one of Cr, Cu and Mo in a predetermined amount relative to the total mass of the wire.

The flux-cored wire preferably further contains metal Mg and an Mg alloy in a predetermined total amount in terms of Mg relative to the total mass of the wire. In addition, the flux-cored wire preferably further contains metal Ti and a Ti alloy in a predetermined total amount in terms of Ti relative to the total mass of the wire. Furthermore, the flux-cored wire preferably further contains B and a B compound in a predetermined total amount in terms of B relative to the total mass of the wire.

The flux-cored wire preferably further contains an F compound in a predetermined total amount in terms of F, and, an Na compound, and a K compound in a predetermined total amount of the total in terms of Na and the total in terms of K, relative to the total mass of the wire. In addition, the flux-cored wire preferably further contains at least one of Nb and V in a predetermined amount relative to the total mass of the wire. Furthermore, the flux-cored wire preferably further contains $ZrO_2$ and $Al_2O_3$ in predetermined amounts relative to the total mass of the wire.

In the flux-cored wire of this embodiment, the components other than those described above, i.e., the remainder, are Fe and unavoidable impurities. The flux-cored wire preferably further contains Fe in a predetermined amount relative to the total mass of the wire.

In the flux-cored wire of this embodiment, C, Mn, $TiO_2$ and Ni are contained in predetermined amounts relative to the total mass of the wire, and the content of each of P and S is equal to or less than the predetermined amount. The contents of other components are not specified. More specifically, with respect to the total in terms of Si of at least one of Si and Si oxide, the contents of Cr, Cu and Mo, the total in terms of Mg of metal Mg and an Mg alloy, the total in terms of Ti of metal Ti and a Ti alloy, the total in terms of B of B and a B compound, the total in terms of F of an F compound, the total in terms of Na of an Na compound, the total in terms of K of a K compound, and the contents of Nb, V, $ZrO_2$, $Al_2O_3$, etc., these are optional components, and the contents thereof are not specified. However, the content of each of these components is preferably the later-described content.

The reasons for limiting the components of the flux-cored wire, and the Ni particle size ratio are described below.

[C: 0.01 Mass % or More and 0.20 Mass % or Less]

C has an effect of enhancing the strength of the weld metal. However, in the case where the C content is less than 0.01 mass % relative to the total mass of the wire, the effect is not sufficiently obtained, and the yield strength of the weld metal decreases. On the other hand, in the case where the C content exceeds 0.20 mass % relative to the total mass of the wire, Martensite-Austenite Constituent is produced in the weld metal, and the toughness deteriorates. For this reason, the C content is 0.01 mass % or more and 0.20 mass % or less relative to the total mass of the wire. From the viewpoint of further enhancing the effect above, the C content is preferably 0.02 mass % or more, more preferably 0.03 mass % or more. From the viewpoint of further enhancing the toughness, it is preferably 0.18 mass % or less, more preferably 0.16 mass % or less.

[Mn: 0.5 Mass % or More and 5.0 Mass % or Less]

Mn has an effect of promoting deoxidation of the weld metal and increasing the toughness and strength of the weld metal. However, in the case where the Mn content is less than 0.5 mass % relative to the total mass of the wire, the above-described effect is insufficient, leading to generation of a blow hole in the weld metal or deterioration of the toughness and strength of the weld metal. On the other hand, in the case where the Mn content exceeds 5.0 mass % relative to the total mass of the wire, the strength of the weld metal is excessively increased to readily cause cold cracking. For this reason, the Mn content is 0.5 mass % or more and 5.0 mass % or less relative to the total mass of the wire. From the viewpoint of further enhancing the effect above, the Mn content is preferably 0.8 mass % or more, more preferably 1.0 mass % or more. From the viewpoint of further suppressing occurrence of cold cracking, it is preferably 4.0 mass % or less, more preferably 3.5 mass % or less.

[$TiO_2$: 2.0 Mass % or More and 10.0 Mass % or Less]

$TiO_2$ is a main component of a slag. In the case where the $TiO_2$ content is less than 2.0 mass % relative to the total mass of the wire, it is difficult to perform welding in a position (vertical, overhead, etc.) except for flat, and all-position weldability cannot be ensured. On the other hand, in the case where the $TiO_2$ content exceeds 10.0 mass % relative to the total mass of the wire, $TiO_2$ remains as a fine particle in the weld metal, and the toughness of the weld metal deteriorates. For this reason, the $TiO_2$ content is 2.0 mass % or more and 10.0 mass % or less relative to the total mass of the wire. From the viewpoint of further enhancing the effect above, the $TiO_2$ content is preferably 3.0 mass % or more, more preferably 4.0 mass % or more. From the viewpoint of further enhancing the toughness, it is preferably 9.0 mass % or less, more preferably 8.0 mass % or less.

[P: 0.050 Mass % or Less (Including 0 Mass %)]

P is an unavoidable impurity, and in the case where the P content exceeds 0.050 mass % relative to the total mass of the wire, the hot cracking resistance of weld metal is reduced due to microsegregation. For this reason, the P content is restricted to be 0.050 mass % or less relative to the total mass of the wire. From the viewpoint of further enhancing the hot cracking resistance, the P content is preferably 0.040 mass % or less, more preferably 0.030 mass % or less. The P content may be 0 mass %.

[S: 0.050 Mass % or Less (Including 0 Mass %)]

S is an unavoidable impurity, and in the case where the S content exceeds 0.050 mass % relative to the total mass of the wire, the hot cracking resistance of the weld metal is reduced due to microsegregation. For this reason, the S content is restricted to be 0.050 mass % or less relative to the total mass of the wire. From the viewpoint of further enhancing the hot cracking resistance, the S content is preferably 0.040 mass % or less, more preferably 0.030 mass % or less. The S content may be 0 mass %.

[Ni: 0.10 Mass % or More and 5.00 Mass % or Less]

Ni is an element contributing to ensuring the toughness of the weld metal by matrix reinforcement. In the case where the Ni content is less than 0.10 mass % relative to the total mass of the wire, the matrix reinforcement effect is insufficient, and the toughness of the weld metal deteriorates. On the other hand, in the case where the Ni content exceeds 5.00 mass % relative to the total mass of the wire, hot cracking readily occurs in the weld metal due to microsegregation. For this reason, the Ni content in the flux is 0.10 mass % or more and 5.00 mass % or less relative to the total mass of the wire. From the viewpoint of further enhancing the effect above, the Ni content is preferably 0.20 mass % or more, and more preferably 0.50 mass % or more. From the viewpoint of further suppressing occurrence of hot cracking, it is preferably 4.50 mass % or less, and more preferably 4.00 mass % or less.

[At Least One of Si and Si Oxide: 0.05 Mass % or More and 1.00 Mass % or Less in Total in Terms of Si]

The flux-cored wire of this embodiment preferably contains at least one of Si and an Si oxide. The metal Si produces $SiO_2$ having an effect of increasing the fluidity by its deoxidizing action. Here, Si added in the form of an oxide is reduced by a redox reaction with a molten metal at the molten slag interface and is present as metal Si in the molten metal.

In the case where the content of at least one of Si and an Si oxide in total in terms of Si is 0.05 mass % or more relative to the total mass of the wire, the deoxidizing effect is further enhanced, and a blow hole is less likely to be formed in the weld metal. On the other hand, in the case where the content of at least one of Si and an Si oxide in total in terms of Si is 1.00 mass % or less, the strength of the weld metal is not excessively increased, and cold cracking hardly occurs. For this reason, in the case of adding at least one of Si and an Si oxide, the content thereof is, in total in terms of Si, preferably 0.05 mass % or more and 1.00 mass % or less relative to the total mass of the wire. From the viewpoint of further enhancing the effect above, the content of at least one of Si and an Si oxide is, in total in terms of Si, more preferably 0.10 mass % or more, still more preferably 0.30 mass % or more. From the viewpoint of further suppressing occurrence of cold cracking, it is more preferably 0.80 mass % or less, still more preferably 0.50 mass % or less.

As for the preferable content of each of Si and an Si oxide, Si is from 0.15 to 0.35 mass %, and the Si oxide is from 0.15 to 0.35 mass %.

[At Least One of Cr: 0.50 Mass % or Less, Cu: 0.50 Mass % or Less, and Mo: 0.50 Mass % or Less]

Cr is an element contributing to enhancement of the strength of the weld metal. In the case where the Cr content is 0.50 mass % or less relative to the total mass of the wire, the strength of the weld metal is not excessively increased, and cold cracking hardly occurs. In addition, hot cracking of the weld metal due to microsegregation is less likely to occur. For this reason, in the case of adding Cr, the Cr content is preferably 0.50 mass % or less relative to the total mass of the wire. From the viewpoint of further suppressing occurrence of cold cracking, the Cr content is more preferably 0.45 mass % or less, still more preferably 0.40 mass % or less. From the viewpoint of further enhancing the effect above, it is preferable to contain this element in an amount of 0.05 mass % or more.

Cu is an element contributing to enhancement of the strength of the weld metal. In the case where the Cu content is 0.50 mass % or less relative to the total mass of the wire, the strength of the weld metal is not excessively increased, and cold cracking hardly occurs. In addition, hot cracking of the weld metal due to microsegregation is less likely to occur. For this reason, in the case of adding Cu, the Cu content is preferably 0.50 mass % or less relative to the total mass of the wire. From the viewpoint of further suppressing occurrence of cold cracking and occurrence of hot cracking, the Cu content is more preferably 0.45 mass % or less, still more preferably 0.40 mass % or less. From the viewpoint of further enhancing the effect above, it is preferable to contain this element in an amount of 0.05 mass % or more.

Mo is an element contributing to enhancement of the strength of weld metal. In the case where the Mo content is 0.50 mass % or less relative to the total mass of the wire, the strength of the weld metal is not excessively increased, and cold cracking hardly occurs. For this reason, in the case of adding Mo, the Mo content is preferably 0.50 mass % or less relative to the total mass of the wire. From the viewpoint of further suppressing occurrence of cold cracking, the Mo content is the Mo content is more preferably 0.45 mass % or less, still more preferably 0.40 mass % or less. From the viewpoint of further enhancing the effect above, it is preferably 0.05 mass % or more.

The total of the Cr, Cu and Mo contents is preferably 0.05 mass % or more and preferably 0.45 mass % or less.

[Metal Mg and Mg Alloy: 0.10 Mass % or More and 1.20 Mass % or Less in Total in Terms of Mg]

Mg is an element having a deoxidizing action, and the flux-cored wire of this embodiment preferably contains, as an Mg source, at least one of metal Mg and an Mg alloy. In the case where the content of metal Mg and an Mg alloy in total in terms of Mg is 0.10 mass % or more relative to the total mass of the wire, the deoxidizing effect is further enhanced, and since the amount of oxygen in the weld metal decreases and the impact value increases, the toughness is further improved. On the other hand, in the case where the content of metal Mg and an Mg alloy in total in terms of Mg is 1.20 mass % or less relative to the total mass of the wire, the strength of the weld metal is not excessively increased, and cold cracking hardly occurs. For this reason, in the case of adding metal Mg and an Mg alloy, the content of metal Mg and an Mg alloy is, in total in terms of Mg, preferably 0.10 mass % or more and 1.20 mass % or less relative to the total mass of the wire. From the viewpoint of further enhancing the effect above, the content of metal Mg and an Mg alloy is, in total in terms of Mg, more preferably 0.20 mass % or more, still more preferably 0.40 mass % or more. From the viewpoint of further suppressing occurrence of cold cracking, it is more preferably 0.80 mass % or less, still more preferably 0.60 mass % or less.

[Metal Ti and Ti Alloy: 0.80 Mass % or Less in Total in Terms of Ti]

Ti is an element contributing to enhancement of the toughness of the weld metal. Ti is added in the form of a metal or an alloy. Out of Ti sources, in the case where the total content of metal Ti and a Ti alloy is, in terms of Ti, 0.80 mass % or less relative to the total mass of the wire, the amount of solute Ti in the weld metal decreases to cause no precipitation of TiC in a reheated part, and the toughness is further enhanced. For this reason, in the case of adding metal Ti and a Ti alloy, the content of metal Ti and a Ti alloy is, in total in terms of Ti, preferably 0.80 mass % or less relative to the total mass of the wire. From the viewpoint of further enhancing the toughness of weld metal, the content of metal Ti and a Ti alloy is, in total in terms of Ti, more preferably 0.70 mass % or less, still more preferably 0.60 mass % or less. From the viewpoint of further enhancing the effect above, it is preferable to contain the component(s) in an amount of 0.10 mass % or more.

[B and B Compound: 0.0010 Mass % or More and 0.0200 Mass % or Less in Total in Terms of B]

B has an effect of enhancing the toughness of the weld metal by segregating at the prior austenite (γ) grain boundary, thereby preventing precipitation of pro-eutectoid ferrite (α). In the case where the content of B and a B compound in total in terms of B is 0.0010 mass % or more relative to the total mass of the wire, the effect thereof is further sufficiently obtained. On the other hand, in the case where the content of B and a B compound in total in terms of B is 0.0200 mass % or less relative to the total mass of the wire, hot cracking (solidification cracking) is less likely to occur in the weld metal.

For this reason, in the case of adding B and a B compound, the content of B and a B compound is preferably 0.0010 mass % or more and 0.0200 mass % or less in total in terms of B relative to the total mass of the wire. From the viewpoint of further enhancing the effect above, the content of B and a B compound is, in total in terms of B more preferably 0.0020 mass % or more, still more preferably 0.0030 mass % or more. From the view point of more suppressing occurrence of hot cracking, it is more preferably 0.0180 mass % or less, still more preferably 0.0160 mass % or less.

[F Compound: 0.01 Mass % or More and 0.50 Mass % or Less in Total in Terms of F, and Sum of the Total in Terms of Na of Na Compound and the Total in Terms of K of K Compound: 0.01 Mass % or More and 1.00 Mass % or Less]

An F compound has an effect of lowering the H partial pressure in the arc atmosphere and decreasing the diffusible hydrogen content in the weld metal, and the flux-cored wire of this embodiment contains one kind of or two or more kinds of F compounds. By reducing the diffusible hydrogen content in the weld metal, occurrence of cold cracking can be suppressed. Specific examples of the F compound added to the flux-cored wire of this embodiment include $CaF_2$, $BaF_2$, NaF, $K_2SiF_6$, $SrF_2$, $AlF_3$, $MgF_2$, and LiF. In the case where the content of an F compound in total in terms of F is 0.01 mass % or more relative to the total mass of the wire, the diffusible hydrogen content in the weld metal decreases, and cold cracking is less likely to occur. On the other hand, in the case where the content of an F compound in total in terms of F is 0.50 mass % or less relative to the total mass of the wire, since the wire is less likely to absorb moisture, the diffusible hydrogen content in the weld metal decreases, and as a result, cold cracking is less likely to occur. For this reason, in the case of adding F, the content of an F compound in total in terms of F is preferably 0.01 mass % or more and 0.50 mass % or less relative to the total mass of the wire. From the viewpoint of further enhancing the effect above, the content of an F compound is, in total in terms of F more preferably 0.05 mass % or more, still more preferably 0.10 mass % or more. From the viewpoint of further suppressing occurrence of cold cracking, it is more preferably 0.30 mass % or less, still more preferably 0.25 mass % or less.

Na and K have an effect of stabilizing the arc. Specific examples of the Na compound added to the flux-cored wire of this embodiment include NaF, $Na_2O$, and $Na_2CO_3$. Specific examples of the K compound added to the flux-cored wire of this embodiment include $K_2O$, KF, and $K_2SiF_6$. In the case where the sum of the total content in terms of Na of an Na compound and the total content in terms of K of a K compound (hereinafter, sometimes referred to as the total of Na compound and K compound) is 0.01 mass % or more relative to the total mass of the wire, the above-described effect is more sufficiently obtained, and the arc is further stabilized. On the other hand, in the case where the total of Na compound and K compound is 1.00 mass % or less, moisture absorption resistance of the wire increases, and the diffusible hydrogen content in the weld metal decreases, and as a result, cold cracking is less likely to occur. For this reason, in the case of adding an Na compound and a K compound, the total of Na compound and K compound is preferably 0.01 mass % or more and 1.00 mass % or less relative to the total mass of the wire. From the viewpoint of further enhancing the effect above, the total of Na compound and K compound is more preferably 0.05 mass % or more, still more preferably 0.10 mass % or more. From the viewpoint of further suppressing occurrence of cold cracking, it is more preferably 0.50 mass % or less, still more preferably 0.30 mass % or less. It is also possible to contain only either one of the Na compound and the K compound.

The flux-cored wire preferably contains all of the F compound, the Na compound and the K compound, but it may also be possible to contain only any one thereof.

[At Least One of Nb: 0.10 Mass % or Less and V: 0.10 Mass % or Less]

Nb is an alloying agent but readily segregates at the grain boundary. In the case where the Nb content is 0.10 mass % or less relative to the total mass of the wire, segregation at the grain boundary is less likely to occur, and grain boundary fracture is hardly generated, and as a result, the toughness of the weld metal is further enhanced. For this reason, in the case of adding Nb, the Nb content is preferably 0.10 mass % or less relative to the total mass of the wire. From the viewpoint of further enhancing the toughness, the Nb content is more preferably 0.05 mass % or less, still more preferably 0.03 mass % or less.

V is an alloying agent but readily segregates at the grain boundary. In the case where the V content is 0.10 mass % or less relative to the total mass of the wire, segregation at the grain boundary is less likely to occur, and grain boundary fracture is hardly generated, and as a result, the toughness of the weld metal is further enhanced. For this reason, in the case of adding V, the V content is preferably 0.10 mass % or less relative to the total mass of the wire. From the viewpoint of further enhancing the toughness, the V content is more preferably 0.05 mass % or less, still more preferably 0.03 mass % or less.

The total of the Nb and V contents is preferably 0.03 mass % or less.

[$ZrO_2$: 0.50 Mass % or Less and $Al_2O_3$: 0.05 Mass % or More and 1.00 Mass % or Less]

$ZrO_2$ has an effect of enhancing the bead shape and can therefore be added, if desired. In the case where the $ZrO_2$ content is 0.50 mass % or less relative to the total mass of the wire, wettability of bead at the toe portion is enhanced, and a convex bead shape is less likely to be formed. For this reason, in the case of adding $ZrO_2$, the content thereof is preferably 0.50 mass % or less relative to the total mass of the wire. From the viewpoint of further improving the bead shape, the $ZrO_2$ content is more preferably 0.30 mass % or less, still more preferably 0.20 mass % or less. From the viewpoint of further enhancing the effect above, it is preferable to contain this oxide in an amount of 0.05 mass % or more.

$Al_2O_3$ has an effect of enhancing the bead shape and can therefore be added, if desired. In the case where the $Al_2O_3$ content is 0.05 mass % or more relative to the total mass of the wire, the effect above is sufficiently obtained. On the other hand, in the case where the $Al_2O_3$ content is 1.00 mass % or less relative to the total mass of the wire, wettability of the bead at the toe portion is enhanced, and a convex bead shape is less likely to be formed. For this reason, in the case of adding $Al_2O_3$, the content thereof is preferably 0.05 mass % or more and 1.00 mass % or less relative to the total mass of the wire. From the viewpoint of further enhancing the effect above, the $Al_2O_3$ content is more preferably 0.10 mass % or more, still more preferably 0.20 mass % or more. From the viewpoint of further improving the bead shape, it is more preferably 0.70 mass % or less, still more preferably 0.50 mass % or less.

The flux-cored wire preferably contains both $ZrO_2$ and $Al_2O_3$, but it may also be possible to contain only either one thereof.

[Remainder: Fe and Unavoidable Impurities]

The remainder in the composition of components of the flux-cored wire of this embodiment are Fe and unavoidable impurities. Examples of the unavoidable impurities include Sb, As, etc. In addition, the remainder sometimes include an alloying agent such as Ca and Li, a compound thereof, an arc stabilizer, or a slag former. In the case where each of the elements above is added as an oxide or a nitride, the remainder of the flux-cored wire of this embodiment include O or N as well. From the viewpoint of ensuring the deposition amount, the flux-cored wire of this embodiment preferably contains Fe in an amount of 75.00 mass % or more relative to the total mass of the wire. In the case where the Fe content is 75.00 mass % or more, a further sufficient deposition amount is obtained. The Fe content is more preferably 80.00 mass % or more.

As for P, S, Sb, As, etc., not only when contained as unavoidable impurities but also even when added positively, as long as the properties of the present invention are not impaired, the effects of the present invention are not hindered.

In addition, the above-described optional components that are not an essential component may be added positively but may also be contained as unavoidable impurities.

[With Respect to Ni, Value of the Ratio $\alpha 1/\alpha 2$ in which $\alpha 1$ (Mass %) is a Content of a Particle Having a Particle Size of 106 μm or Less Relative to the Total Mass of the Wire and $\alpha 2$ (Mass %) is a Content of a Particle Having a Particle Size of More than 106 μm Relative to the Total Mass of the Wire: 0.50 or More and 1.00 or Less]

In this embodiment, in order to properly control the amount of Ni transferred to the weld metal during a melting process and to keep the diffusible hydrogen content low, the ratio of particle sizes (particle size ratio) of Ni is specified.

The particle size of Ni as used herein means a particle diameter of Ni, and the minor axis of a Ni particle after drawing is taken as the particle diameter of Ni.

With respect to Ni, in the case where the content of a particle having a particle size of 106 μm or less relative to the total mass of the wire is denoted by $\alpha 1$ (mass %) and the content of a particle having a particle size of more than 106 μm relative to the total mass of the wire is denoted by $\alpha 2$ (mass %), if the value of the ratio $\alpha 1/\alpha 2$ is less than 0.50, Ni is non-uniformly fed in the weld metal, and the microsegregation is promoted to deteriorate the hot cracking resistance of the weld metal. On the other hand, if the value of the ratio $\alpha 1/\alpha 2$ exceeds 1.00, oxidative consumption progresses because of a large surface area of Ni, and the amount of Ni transferred into the weld metal is decreased to cause embrittlement of a matrix formed of the weld metal. In addition, a contact area between Ni and metal raw materials such as Mn, Mg and Fe is increased by increasing the surface area of Ni. Accordingly, the corrosion of the metal raw materials is promoted due to a potential difference between Ni and the metal raw materials to form oxides, and therefore, moisture is readily absorbed to increase the diffusible hydrogen content in the weld metal. Accordingly, the value of the ratio $\alpha 1/\alpha 2$ is 0.50 or more and 1.00 or less. From the viewpoint of further enhancing the hot cracking resistance of the weld metal, the value of the ratio $\alpha 1/\alpha 2$ is preferably 0.60 or more, more preferably 0.65 or more. From the viewpoint of further suppressing the embrittlement of the matrix and decreasing the surface area of Ni, it is is preferably 0.90 or less, more preferably 0.85 or less. As the raw material of Ni, in addition to Ni, Ni—Mg, Fe—Ni or the like can be used.

The specified particle size ratio of Ni is statistically determined from a large number of experiments.

(Method for Adjusting Particle Size of Ni)

The particle size of Ni can be adjusted, for example, by the following method.

A Ni raw material where, relative to the total mass of the Ni raw material, the content of a particle having a particle diameter of 106 μm or less is adjusted to be 15 mass % or more and 55 mass % or less and the content of a particle having the particle diameter of more than 106 μm is adjusted to be 45 mass % or more and 85 mass % or less, is used. This Ni raw material is added in an amount of 0.1 mass % or more and 5.0 mass % or less relative to the total mass of the wire. Then, as illustrated in (c)→(d) of FIG. 1, the inside of a steel outer sheath 1 is filled with flux 2 containing Ni and after forming the steel outer sheath 1 such that the flux is enclosed inside the steel outer sheath 1, the wire is drawn as illustrated in (d)→(e) of FIG. 1. The formed wire is drawn, for example, from a wire diameter of 5.0 mmφ to 1.2 mmφ, whereby the Ni particle size distribution of the flux enclosed in the flux-cored wire after drawing can be adjusted to fall within the above-described specific range. The Ni raw material used for the flux-cored wire of this embodiment can be produced by a conventional method. In addition, the method for adjusting the particle size distribution of the Ni raw material to fall within the specific range is not particularly limited, and examples thereof include a method of applying a pulverization treatment and a method of mixing a plurality of kinds of raw materials.

(Method for Measuring Particle Size of Ni)

The particle size of Ni can be measured, for example, by the following method.

Flux is collected from the flux-cored wire after drawing and separated by a sieve in conformity with JIS Z 8801-1: 2006 into (1) a flux component having a particle diameter of 106 μm or less and (2) a flux component having a particle diameter of more than 106 μm by using RPS-105 manufactured by Seishin Enterprise Co., Ltd. As the sieving conditions, a sound wave frequency is 80 Hz, a pulse interval is 1 second, and a classification time is 2 minutes. The content of Ni having a particle size of 106 μm or less and the content of Ni having a particle size of more than 106 μm can thereby be measured, and the particle size ratio can be calculated from those flux components separated.

[Others]

In the flux-cored wire of this embodiment, the steel outer sheath is filled with flux, and the outer diameter (diameter) of the wire is, for example, from 0.9 to 2.0 mm. The flux filling rate may be an arbitrary value as long as each component in the wire falls within the range of the present invention, but in view of wire drawing property and workability (e.g., feedability) during welding, the flux filling rate is preferably from 10 to 20 mass % based on the total mass of the wire.

[Manufacturing Method]

The method for manufacturing the flux-cored wire of this embodiment is not particularly limited but can be manufactured, for example, by the following method. As illustrated in FIG. 1, first, a steel strip constituting a steel outer sheath 1 is prepared ((a) of FIG. 1: first step), the steel strip is formed on a forming roll while feeding it in the longitudinal direction to make a U-shaped open tube ((b) of FIG. 1: second step). Next, the steel outer sheath 1 is filled with flux 2 having blended therein an oxide, a metal or alloy, an Fe powder, etc. each in a predetermined amount ((c) of FIG. 1: third step) and then processed to have a circular cross-section ((d) of FIG. 1: fourth step). The wire is thereafter drawn by cold working to obtain a flux-cored wire 10 having a wire diameter of, for example, from 0.9 to 2.0 mm ((e) of FIG. 1: fifth step). In the middle of cold working, annealing may be applied. In addition, either a seamless wire in which a seam of the formed steel outer sheath 1 is welded in the process of production, or a wire in which the seam above is left to remain as a gap without being welded, can be employed.

EXAMPLES

The effects of the present invention are specifically described below by referring to Examples of the present invention and Comparative Examples.

In these working examples, the flux-cored wires of Examples and Comparative Examples were produced in accordance with the above-described manufacturing method by filling a tubular sheath (diameter: 1.2 mm) formed of a carbon steel having a component composition in the ranges shown in Table 1 below with flux. The remainder of the outer sheath components shown in Table 1 are Fe and unavoidable impurities. At this time, the flux filling rate was adjusted to fall within the range of 13.0 to 14.0 mass % relative to the total mass of the wire.

TABLE 1

| Ranges of Outer Sheath Components (mass %) | | | | | | | | | | |
|---|---|---|---|---|---|---|---|---|---|---|
| C | Si | Mn | P | S | Cu | Ni | Cr | Ti | Al | B |
| ≤0.10 | ≤0.10 | 0.10-0.90 | ≤0.03 | ≤0.03 | ≤0.20 | | | ≤0.05 | ≤0.05 | ≤0.005 |

In Tables 2 and 3 below, the Ni particle size ratio of Examples and Comparative Examples and the component composition of the entire wire are shown. The remainder of the wire components shown in Tables 2 and 3 is unavoidable impurities.

In addition, in Tables 2 and 3, "total.Si", "total.B", "total.F", and "total.[Na+K]" mean "the total in terms of Si of at least one of Si and Si oxide", "the total in terms of B of B and B compound", "the total in terms of F of F compound", and "the sum total of the total in terms of Na of Na compound and the total in terms of K of K compound", respectively. The "sol.Ti" and "sol.Mg" mean "the total in terms of Ti of metal Ti and Ti alloy" and "the total in terms of Mg of metal Mg and Mg alloy", respectively. In addition, Ni was contained in the flux.

Furthermore, in Tables 2 and 3, as for those not satisfying the ranges of the present invention, and with respect to optional components and Fe, those not satisfying the preferable ranges, the numerical value is indicated by underlining.

TABLE 2

| No. | Ni particle size ratio | Wire Component (mass %) | | | | | | | | | | |
|---|---|---|---|---|---|---|---|---|---|---|---|---|
| | | C | P | S | Mn | Ni | TiO$_2$ | total.Si | Cr | Cu | sol.Ti | sol.Mg |
| 1 | 0.79 | 0.07 | 0.006 | 0.002 | 1.6 | 2.10 | 5.2 | 0.43 | 0.00 | 0.00 | 0.14 | 0.47 |
| 2 | 0.70 | 0.05 | 0.007 | 0.003 | 2.7 | 0.98 | 6.2 | 0.45 | 0.00 | 0.00 | 0.14 | 0.46 |
| 3 | 0.73 | 0.05 | 0.008 | 0.003 | 2.2 | 0.78 | 5.5 | 0.46 | 0.01 | 0.00 | 0.14 | 0.40 |
| 4 | 0.68 | 0.11 | 0.002 | 0.003 | 1.6 | 4.11 | 4.0 | 0.00 | 0.00 | 0.00 | 0.00 | 0.00 |
| 5 | 0.79 | 0.08 | 0.008 | 0.002 | 1.2 | 2.55 | 4.6 | 0.00 | 0.00 | 0.00 | 0.00 | 0.00 |
| 6 | 0.95 | 0.11 | 0.006 | 0.028 | 4.3 | 0.57 | 6.7 | 0.23 | 0.03 | 0.01 | 0.69 | 0.78 |
| 7 | 0.51 | 0.07 | 0.020 | 0.031 | 3.5 | 2.58 | 3.2 | 0.78 | 0.03 | 0.02 | 0.28 | 0.11 |
| 8 | 0.80 | 0.07 | 0.014 | 0.020 | 3.7 | 4.44 | 9.3 | 0.35 | 0.02 | 0.04 | 0.66 | 0.95 |
| 9 | 0.81 | 0.10 | 0.017 | 0.008 | 3.0 | 2.80 | 6.4 | 0.57 | 0.04 | 0.02 | 0.47 | 0.54 |
| 10 | 0.56 | 0.19 | 0.007 | 0.020 | 0.7 | 1.62 | 8.7 | 0.60 | 0.01 | 0.04 | 0.18 | 0.64 |
| 11 | 0.61 | 0.02 | 0.014 | 0.033 | 1.5 | 2.54 | 7.9 | 0.86 | 0.03 | 0.01 | 0.25 | 0.79 |
| 12 | 0.68 | 0.03 | 0.040 | 0.011 | 4.7 | 0.57 | 8.2 | 0.13 | 0.02 | 0.04 | 0.09 | 0.41 |
| 13 | 0.69 | 0.12 | 0.000 | 0.022 | 4.0 | 4.42 | 5.2 | 0.35 | 0.04 | 0.01 | 0.22 | 0.98 |
| 14 | 0.90 | 0.10 | 0.003 | 0.050 | 3.2 | 2.31 | 7.8 | 0.85 | 0.00 | 0.03 | 0.22 | 0.85 |
| 15 | 0.62 | 0.06 | 0.024 | 0.000 | 3.7 | 3.04 | 5.0 | 0.88 | 0.04 | 0.02 | 0.47 | 0.19 |
| 16 | 0.89 | 0.04 | 0.018 | 0.019 | 4.9 | 4.26 | 7.3 | 0.84 | 0.03 | 0.03 | 0.39 | 0.86 |
| 17 | 0.65 | 0.07 | 0.026 | 0.026 | 0.6 | 4.56 | 4.7 | 0.75 | 0.04 | 0.04 | 0.48 | 0.39 |
| 18 | 0.83 | 0.06 | 0.028 | 0.025 | 2.4 | 4.99 | 4.3 | 0.09 | 0.02 | 0.01 | 0.54 | 0.87 |
| 19 | 0.85 | 0.06 | 0.012 | 0.032 | 4.8 | 0.10 | 7.5 | 0.56 | 0.03 | 0.02 | 0.14 | 0.88 |
| 20 | 0.71 | 0.11 | 0.029 | 0.003 | 3.5 | 3.21 | 9.9 | 0.40 | 0.01 | 0.02 | 0.46 | 0.94 |
| 21 | 0.64 | 0.09 | 0.023 | 0.030 | 1.2 | 3.98 | 2.2 | 0.28 | 0.01 | 0.01 | 0.47 | 0.18 |
| 22 | 0.66 | 0.14 | 0.028 | 0.018 | 2.9 | 0.68 | 8.7 | 0.98 | 0.03 | 0.02 | 0.68 | 0.27 |
| 23 | 0.73 | 0.05 | 0.019 | 0.013 | 1.2 | 2.66 | 5.3 | 0.06 | 0.03 | 0.01 | 0.34 | 0.89 |
| 24 | 0.55 | 0.08 | 0.003 | 0.006 | 1.0 | 2.44 | 4.5 | 0.77 | 0.49 | 0.03 | 0.41 | 0.50 |
| 25 | 0.76 | 0.17 | 0.007 | 0.017 | 1.4 | 3.02 | 3.7 | 0.19 | 0.00 | 0.00 | 0.52 | 0.60 |
| 26 | 0.60 | 0.07 | 0.011 | 0.009 | 3.1 | 2.96 | 2.8 | 0.63 | 0.04 | 0.48 | 0.67 | 0.78 |
| 27 | 0.66 | 0.15 | 0.028 | 0.002 | 1.6 | 3.00 | 3.6 | 0.20 | 0.01 | 0.00 | 0.22 | 0.12 |
| 28 | 0.51 | 0.09 | 0.010 | 0.011 | 4.4 | 4.40 | 7.5 | 0.12 | 0.04 | 0.00 | 0.80 | 0.49 |
| 29 | 0.90 | 0.14 | 0.021 | 0.002 | 1.9 | 4.65 | 8.2 | 0.07 | 0.03 | 0.04 | 0.00 | 0.45 |
| 30 | 0.51 | 0.05 | 0.021 | 0.002 | 2.2 | 3.50 | 8.8 | 0.07 | 0.40 | 0.05 | 0.62 | 1.15 |
| 31 | 0.64 | 0.05 | 0.022 | 0.004 | 1.5 | 2.20 | 8.4 | 0.05 | 0.05 | 0.04 | 0.44 | 0.12 |
| 32 | 0.82 | 0.06 | 0.010 | 0.005 | 1.8 | 2.60 | 9.5 | 0.05 | 0.03 | 0.04 | 0.35 | 0.80 |
| 33 | 0.59 | 0.05 | 0.015 | 0.006 | 1.6 | 3.20 | 2.5 | 0.05 | 0.03 | 0.04 | 0.25 | 0.60 |
| 34 | 0.88 | 0.11 | 0.015 | 0.006 | 3.6 | 0.21 | 8.8 | 0.09 | 0.03 | 0.02 | 0.26 | 0.65 |
| 35 | 0.81 | 0.04 | 0.018 | 0.001 | 1.7 | 0.69 | 8.6 | 0.21 | 0.04 | 0.00 | 0.09 | 0.98 |
| 36 | 0.74 | 0.14 | 0.021 | 0.014 | 1.8 | 2.08 | 7.2 | 0.50 | 0.04 | 0.03 | 0.51 | 0.60 |
| 37 | 0.67 | 0.09 | 0.027 | 0.025 | 3.5 | 4.18 | 7.8 | 0.62 | 0.01 | 0.03 | 0.05 | 0.74 |
| 38 | 0.82 | 0.11 | 0.012 | 0.025 | 4.0 | 2.61 | 8.3 | 0.41 | 0.03 | 0.04 | 0.49 | 0.60 |
| 39 | 0.66 | 0.06 | 0.028 | 0.006 | 2.4 | 1.84 | 4.1 | 0.50 | 0.04 | 0.01 | 0.61 | 1.05 |
| 40 | 0.59 | 0.06 | 0.002 | 0.032 | 1.2 | 4.33 | 3.1 | 0.44 | 0.02 | 0.04 | 0.33 | 0.14 |
| 41 | 0.52 | 0.08 | 0.012 | 0.021 | 1.9 | 0.61 | 3.6 | 0.38 | 0.02 | 0.01 | 0.71 | 0.58 |
| 42 | 0.55 | 0.13 | 0.017 | 0.014 | 0.9 | 3.22 | 2.7 | 0.79 | 0.03 | 0.01 | 0.67 | 0.34 |

| No. | Wire Component (mass %) | | | | | | | | |
|---|---|---|---|---|---|---|---|---|---|
| | Mo | total.B | total.F | total.[Na + K] | Nb | V | ZrO$_2$ | Al$_2$O$_3$ | Fe |
| 1 | 0.00 | 0.0080 | 0.11 | 0.12 | 0.03 | 0.00 | 0.06 | 0.24 | 89.41 |
| 2 | 0.00 | 0.0077 | 0.16 | 0.16 | 0.00 | 0.00 | 0.00 | 0.28 | 88.40 |
| 3 | 0.40 | 0.0090 | 0.15 | 0.16 | 0.01 | 0.02 | 0.06 | 0.05 | 89.59 |
| 4 | 0.00 | 0.0000 | 0.00 | 0.00 | 0.00 | 0.00 | 0.00 | 0.00 | 90.17 |
| 5 | 0.00 | 0.0000 | 0.00 | 0.00 | 0.00 | 0.00 | 0.00 | 0.00 | 91.56 |
| 6 | 0.26 | 0.0051 | 0.28 | 0.49 | 0.02 | 0.02 | 0.03 | 0.58 | 84.86 |
| 7 | 0.23 | 0.0096 | 0.15 | 0.56 | 0.03 | 0.02 | 0.07 | 0.76 | 87.54 |
| 8 | 0.29 | 0.0102 | 0.24 | 0.50 | 0.02 | 0.01 | 0.04 | 0.21 | 79.11 |
| 9 | 0.27 | 0.0052 | 0.19 | 0.62 | 0.01 | 0.02 | 0.04 | 0.67 | 84.21 |
| 10 | 0.27 | 0.0130 | 0.37 | 0.64 | 0.01 | 0.02 | 0.04 | 0.37 | 85.56 |
| 11 | 0.04 | 0.0111 | 0.33 | 0.56 | 0.03 | 0.03 | 0.07 | 0.61 | 84.37 |
| 12 | 0.27 | 0.0084 | 0.13 | 0.50 | 0.01 | 0.02 | 0.07 | 0.82 | 83.93 |
| 13 | 0.25 | 0.0056 | 0.27 | 0.47 | 0.02 | 0.02 | 0.08 | 0.67 | 82.85 |
| 14 | 0.26 | 0.0111 | 0.27 | 0.54 | 0.01 | 0.02 | 0.02 | 0.57 | 82.88 |
| 15 | 0.30 | 0.0056 | 0.21 | 0.44 | 0.02 | 0.02 | 0.05 | 0.60 | 84.93 |
| 16 | 0.33 | 0.0074 | 0.18 | 0.42 | 0.03 | 0.03 | 0.06 | 0.12 | 80.13 |
| 17 | 0.18 | 0.0141 | 0.41 | 0.49 | 0.03 | 0.01 | 0.05 | 0.79 | 86.34 |
| 18 | 0.36 | 0.0079 | 0.25 | 0.45 | 0.02 | 0.02 | 0.05 | 0.28 | 85.22 |
| 19 | 0.33 | 0.0130 | 0.14 | 0.68 | 0.03 | 0.02 | 0.08 | 0.32 | 84.25 |
| 20 | 0.01 | 0.0100 | 0.40 | 0.49 | 0.01 | 0.03 | 0.01 | 0.78 | 79.67 |

TABLE 2-continued

| | | | | | | | | | | |
|---|---|---|---|---|---|---|---|---|---|---|
| 21 | 0.33 | 0.0070 | 0.16 | 0.56 | 0.01 | 0.01 | 0.07 | 0.59 | 89.79 |
| 22 | 0.07 | 0.0071 | 0.07 | 0.50 | 0.02 | 0.02 | 0.07 | 0.84 | 83.95 |
| 23 | 0.20 | 0.0081 | 0.18 | 0.63 | 0.01 | 0.02 | 0.06 | 0.58 | 87.74 |
| 24 | 0.16 | 0.0124 | 0.28 | 0.42 | 0.02 | 0.01 | 0.08 | 0.16 | 88.65 |
| 25 | 0.19 | 0.0050 | 0.35 | 0.70 | 0.01 | 0.02 | 0.02 | 0.56 | 88.52 |
| 26 | 0.38 | 0.0128 | 0.44 | 0.61 | 0.02 | 0.02 | 0.03 | 0.84 | 86.09 |
| 27 | 0.17 | 0.0131 | 0.12 | 0.55 | 0.02 | 0.02 | 0.02 | 0.66 | 89.49 |
| 28 | 0.39 | 0.0069 | 0.33 | 0.49 | 0.02 | 0.01 | 0.06 | 0.63 | 80.20 |
| 29 | 0.23 | 0.0085 | 0.37 | 0.60 | 0.02 | 0.01 | 0.04 | 0.75 | 82.46 |
| 30 | 0.20 | 0.0085 | 0.36 | 0.50 | 0.06 | 0.06 | 0.02 | 0.85 | 81.07 |
| 31 | 0.35 | 0.0100 | 0.33 | 0.49 | 0.04 | 0.04 | 0.05 | 0.48 | 85.33 |
| 32 | 0.49 | 0.0150 | 0.35 | 0.64 | 0.04 | 0.01 | 0.03 | 0.69 | 82.49 |
| 33 | 0.00 | 0.0140 | 0.45 | 0.64 | 0.02 | 0.04 | 0.01 | 0.36 | 90.12 |
| 34 | 0.03 | 0.0190 | 0.20 | 0.58 | 0.02 | 0.03 | 0.07 | 0.83 | 84.43 |
| 35 | 0.05 | 0.0020 | 0.39 | 0.49 | 0.01 | 0.03 | 0.07 | 0.46 | 86.12 |
| 36 | 0.23 | 0.0058 | 0.48 | 0.41 | 0.02 | 0.01 | 0.05 | 0.39 | 85.46 |
| 37 | 0.12 | 0.0081 | 0.02 | 0.51 | 0.02 | 0.01 | 0.02 | 0.80 | 81.42 |
| 38 | 0.08 | 0.0072 | 0.23 | 0.98 | 0.03 | 0.01 | 0.04 | 0.33 | 81.66 |
| 39 | 0.24 | 0.0089 | 0.24 | 0.02 | 0.02 | 0.02 | 0.08 | 0.39 | 88.33 |
| 40 | 0.00 | 0.0036 | 0.28 | 0.42 | 0.09 | 0.03 | 0.05 | 0.11 | 89.32 |
| 41 | 0.16 | 0.0121 | 0.20 | 0.65 | 0.00 | 0.02 | 0.02 | 0.48 | 90.53 |
| 42 | 0.10 | 0.0059 | 0.33 | 0.66 | 0.02 | 0.09 | 0.06 | 0.42 | 89.49 |

TABLE 3

| No. | Ni Particle Size Ratio | Wire Component (mass %) | | | | | | | | | |
|---|---|---|---|---|---|---|---|---|---|---|---|
| | | C | P | S | Mn | Ni | TiO$_2$ | total.Si | Cr | Cu | sol.Ti | sol.Mg |
| 43 | 0.78 | 0.03 | 0.011 | 0.015 | 4.4 | 4.28 | 3.3 | 0.27 | 0.02 | 0.03 | 0.44 | 1.15 |
| 44 | 0.54 | 0.07 | 0.011 | 0.012 | 2.7 | 0.15 | 4.6 | 0.42 | 0.01 | 0.01 | 0.65 | 0.99 |
| 45 | 0.86 | 0.07 | 0.003 | 0.011 | 2.5 | 3.85 | 6.8 | 0.79 | 0.02 | 0.03 | 0.28 | 0.62 |
| 46 | 0.60 | 0.04 | 0.013 | 0.028 | 2.7 | 0.50 | 8.4 | 0.49 | 0.02 | 0.04 | 0.23 | 0.89 |
| 47 | 0.67 | 0.13 | 0.007 | 0.014 | 2.2 | 2.74 | 3.0 | 0.17 | 0.02 | 0.04 | 0.25 | 0.84 |
| 48 | 0.84 | 0.14 | 0.011 | 0.014 | 3.3 | 0.51 | 8.1 | 0.07 | 0.00 | 0.04 | 0.44 | 1.14 |
| 49 | 0.70 | 0.09 | 0.015 | 0.014 | 2.6 | 2.79 | 6.3 | 0.26 | 0.01 | 0.01 | 0.21 | 0.60 |
| 50 | 1.10 | 0.03 | 0.030 | 0.028 | 0.9 | 3.53 | 7.9 | 0.25 | 0.02 | 0.02 | 0.14 | 0.43 |
| 51 | 0.40 | 0.13 | 0.002 | 0.005 | 1.0 | 4.26 | 2.6 | 0.14 | 0.01 | 0.03 | 0.43 | 0.27 |
| 52 | 0.77 | 0.22 | 0.014 | 0.033 | 2.7 | 2.16 | 2.9 | 0.84 | 0.00 | 0.00 | 0.60 | 0.20 |
| 53 | 0.75 | 0.00 | 0.023 | 0.006 | 4.7 | 0.85 | 2.3 | 0.73 | 0.04 | 0.01 | 0.69 | 0.13 |
| 54 | 0.54 | 0.06 | 0.060 | 0.012 | 3.5 | 0.70 | 6.4 | 0.21 | 0.01 | 0.01 | 0.62 | 0.81 |
| 55 | 0.77 | 0.07 | 0.029 | 0.060 | 2.0 | 1.69 | 4.0 | 0.44 | 0.03 | 0.02 | 0.48 | 0.62 |
| 56 | 0.54 | 0.07 | 0.014 | 0.005 | 5.2 | 0.81 | 9.2 | 0.47 | 0.01 | 0.03 | 0.46 | 0.38 |
| 57 | 0.79 | 0.03 | 0.002 | 0.014 | 0.4 | 2.02 | 8.3 | 0.07 | 0.01 | 0.03 | 0.42 | 0.62 |
| 58 | 0.68 | 0.11 | 0.016 | 0.003 | 2.9 | 5.11 | 4.0 | 0.79 | 0.03 | 0.03 | 0.67 | 0.80 |
| 59 | 0.57 | 0.06 | 0.024 | 0.030 | 4.2 | 0.00 | 3.2 | 0.65 | 0.03 | 0.01 | 0.21 | 0.83 |
| 60 | 0.65 | 0.07 | 0.002 | 0.021 | 2.2 | 1.38 | 11.2 | 0.89 | 0.03 | 0.02 | 0.69 | 0.14 |
| 61 | 0.76 | 0.06 | 0.007 | 0.015 | 2.7 | 3.60 | 1.8 | 0.64 | 0.03 | 0.03 | 0.16 | 0.37 |
| 62 | 1.20 | 0.03 | 0.007 | 0.010 | 2.3 | 1.20 | 4.5 | 0.43 | 0.04 | 0.00 | 0.45 | 0.30 |
| 63 | 0.69 | 0.05 | 0.029 | 0.029 | 1.6 | 3.59 | 7.5 | 1.05 | 0.02 | 0.01 | 0.40 | 0.90 |
| 64 | 0.75 | 0.03 | 0.013 | 0.005 | 2.1 | 1.90 | 4.8 | 0.04 | 0.01 | 0.04 | 0.10 | 0.58 |
| 65 | 0.70 | 0.12 | 0.030 | 0.015 | 4.1 | 2.55 | 3.5 | 0.27 | 0.52 | 0.02 | 0.57 | 0.96 |
| 66 | 0.82 | 0.17 | 0.030 | 0.009 | 1.0 | 4.35 | 9.4 | 0.09 | 0.00 | 0.51 | 0.08 | 0.53 |
| 67 | 0.71 | 0.10 | 0.022 | 0.013 | 1.1 | 4.61 | 8.4 | 0.57 | 0.02 | 0.03 | 0.84 | 1.00 |
| 68 | 0.82 | 0.05 | 0.030 | 0.040 | 2.5 | 3.54 | 8.8 | 0.54 | 0.25 | 0.42 | 0.75 | 1.25 |
| 69 | 0.65 | 0.09 | 0.050 | 0.025 | 2.4 | 3.65 | 2.9 | 0.49 | 0.25 | 0.37 | 0.46 | 0.09 |
| 70 | 0.72 | 0.10 | 0.040 | 0.020 | 2.7 | 3.95 | 8.5 | 0.36 | 0.35 | 0.33 | 0.70 | 1.15 |
| 71 | 0.67 | 0.16 | 0.002 | 0.028 | 4.3 | 2.20 | 2.5 | 0.46 | 0.02 | 0.26 | 0.64 | 0.97 |
| 72 | 0.86 | 0.02 | 0.028 | 0.008 | 4.6 | 4.73 | 9.3 | 0.53 | 0.02 | 0.03 | 0.47 | 0.62 |
| 73 | 0.66 | 0.15 | 0.018 | 0.020 | 1.9 | 1.25 | 7.5 | 0.45 | 0.01 | 0.00 | 0.60 | 0.83 |
| 74 | 0.73 | 0.16 | 0.014 | 0.001 | 4.0 | 0.20 | 4.4 | 0.89 | 0.03 | 0.04 | 0.22 | 0.91 |
| 75 | 0.76 | 0.13 | 0.021 | 0.023 | 1.2 | 3.42 | 3.4 | 0.46 | 0.01 | 0.02 | 0.22 | 1.03 |
| 76 | 0.65 | 0.16 | 0.009 | 0.030 | 0.9 | 3.94 | 5.1 | 0.89 | 0.03 | 0.01 | 0.22 | 1.01 |
| 77 | 0.60 | 0.12 | 0.020 | 0.019 | 4.5 | 1.95 | 5.2 | 0.70 | 0.04 | 0.04 | 0.29 | 0.73 |
| 78 | 0.63 | 0.13 | 0.014 | 0.012 | 4.4 | 0.10 | 9.5 | 0.14 | 0.03 | 0.04 | 0.54 | 0.32 |
| 79 | 0.85 | 0.14 | 0.007 | 0.019 | 3.6 | 2.15 | 5.0 | 0.09 | 0.04 | 0.03 | 0.44 | 0.21 |
| 80 | 0.86 | 0.04 | 0.025 | 0.025 | 4.7 | 4.29 | 3.4 | 0.91 | 0.02 | 0.04 | 0.69 | 0.88 |
| 81 | 0.88 | 0.15 | 0.030 | 0.007 | 0.7 | 1.00 | 8.8 | 0.22 | 0.01 | 0.03 | 0.12 | 0.47 |
| 82 | 0.81 | 0.03 | 0.026 | 0.020 | 4.5 | 4.90 | 10.0 | 0.95 | 0.43 | 0.43 | 0.75 | 1.10 |

TABLE 3-continued

| | Wire Component (mass %) | | | | | | | | |
|---|---|---|---|---|---|---|---|---|---|
| No. | Mo | total.B | total.F | total.[Na + K] | Nb | V | ZrO$_2$ | Al$_2$O$_3$ | Fe |
| 43 | 0.15 | 0.0082 | 0.23 | 0.71 | 0.01 | 0.00 | 0.05 | 0.79 | 84.10 |
| 44 | 0.21 | 0.0079 | 0.28 | 0.44 | 0.02 | 0.02 | 0.49 | 0.63 | 88.27 |
| 45 | 0.17 | 0.0143 | 0.41 | 0.57 | 0.02 | 0.01 | 0.00 | 0.73 | 83.10 |
| 46 | 0.22 | 0.0034 | 0.37 | 0.63 | 0.02 | 0.03 | 0.01 | 0.90 | 84.46 |
| 47 | 0.37 | 0.0129 | 0.23 | 0.50 | 0.02 | 0.01 | 0.02 | 0.06 | 89.36 |
| 48 | 0.15 | 0.0060 | 0.25 | 0.46 | 0.02 | 0.02 | 0.05 | 0.76 | 84.51 |
| 49 | 0.33 | 0.0056 | 0.22 | 0.56 | 0.03 | 0.02 | 0.04 | 0.54 | 85.35 |
| 50 | 0.09 | 0.0095 | 0.38 | 0.61 | 0.02 | 0.01 | 0.03 | 0.81 | 84.76 |
| 51 | 0.14 | 0.0040 | 0.40 | 0.49 | 0.02 | 0.03 | 0.03 | 0.65 | 89.35 |
| 52 | 0.22 | 0.0083 | 0.09 | 0.53 | 0.02 | 0.01 | 0.08 | 0.60 | 88.77 |
| 53 | 0.16 | 0.0060 | 0.45 | 0.54 | 0.01 | 0.03 | 0.05 | 0.37 | 88.90 |
| 54 | 0.15 | 0.0133 | 0.34 | 0.68 | 0.02 | 0.02 | 0.07 | 0.72 | 85.59 |
| 55 | 0.24 | 0.0035 | 0.25 | 0.67 | 0.02 | 0.03 | 0.06 | 0.14 | 89.14 |
| 56 | 0.08 | 0.0064 | 0.09 | 0.65 | 0.03 | 0.02 | 0.01 | 0.16 | 82.30 |
| 57 | 0.03 | 0.0148 | 0.21 | 0.60 | 0.01 | 0.03 | 0.06 | 0.66 | 86.46 |
| 58 | 0.35 | 0.0096 | 0.10 | 0.56 | 0.03 | 0.03 | 0.08 | 0.46 | 83.92 |
| 59 | 0.28 | 0.0149 | 0.31 | 0.45 | 0.03 | 0.02 | 0.01 | 0.78 | 88.86 |
| 60 | 0.33 | 0.0079 | 0.34 | 0.45 | 0.01 | 0.03 | 0.08 | 0.32 | 81.78 |
| 61 | 0.20 | 0.0062 | 0.25 | 0.46 | 0.01 | 0.02 | 0.07 | 0.48 | 89.09 |
| 62 | 0.00 | 0.0100 | 0.82 | 0.27 | 0.00 | 0.00 | 0.20 | 0.20 | 81.23 |
| 63 | 0.14 | 0.0145 | 0.35 | 0.46 | 0.03 | 0.02 | 0.05 | 0.22 | 83.53 |
| 64 | 0.22 | 0.0110 | 0.10 | 0.53 | 0.02 | 0.02 | 0.02 | 0.16 | 89.30 |
| 65 | 0.21 | 0.0088 | 0.15 | 0.68 | 0.02 | 0.02 | 0.04 | 0.82 | 85.39 |
| 66 | 0.20 | 0.0127 | 0.23 | 0.66 | 0.02 | 0.02 | 0.03 | 0.14 | 82.51 |
| 67 | 0.38 | 0.0047 | 0.29 | 0.53 | 0.01 | 0.02 | 0.03 | 0.19 | 81.84 |
| 68 | 0.21 | 0.0015 | 0.44 | 0.26 | 0.08 | 0.01 | 0.40 | 0.28 | 80.14 |
| 69 | 0.06 | 0.0023 | 0.06 | 0.22 | 0.05 | 0.02 | 0.35 | 0.50 | 87.96 |
| 70 | 0.55 | 0.0022 | 0.04 | 0.60 | 0.01 | 0.08 | 0.33 | 0.20 | 79.98 |
| 71 | 0.39 | 0.0250 | 0.17 | 0.62 | 0.01 | 0.02 | 0.06 | 0.38 | 86.78 |
| 72 | 0.36 | 0.0006 | 0.44 | 0.46 | 0.02 | 0.02 | 0.06 | 0.23 | 78.05 |
| 73 | 0.22 | 0.0040 | 0.55 | 0.48 | 0.02 | 0.03 | 0.04 | 0.50 | 85.42 |
| 74 | 0.02 | 0.0046 | 0.00 | 0.69 | 0.02 | 0.01 | 0.07 | 0.73 | 87.59 |
| 75 | 0.04 | 0.0149 | 0.20 | 1.11 | 0.02 | 0.03 | 0.06 | 0.78 | 87.81 |
| 76 | 0.17 | 0.0124 | 0.11 | 0.004 | 0.02 | 0.01 | 0.04 | 0.75 | 86.58 |
| 77 | 0.21 | 0.0119 | 0.13 | 0.48 | 0.11 | 0.03 | 0.04 | 0.22 | 85.15 |
| 78 | 0.04 | 0.0069 | 0.36 | 0.68 | 0.02 | 0.12 | 0.08 | 0.52 | 82.94 |
| 79 | 0.01 | 0.0061 | 0.23 | 0.69 | 0.03 | 0.01 | 0.52 | 0.41 | 86.36 |
| 80 | 0.15 | 0.0145 | 0.06 | 0.56 | 0.01 | 0.03 | 0.01 | 1.10 | 83.04 |
| 81 | 0.15 | 0.0090 | 0.13 | 0.56 | 0.01 | 0.02 | 0.08 | 0.04 | 87.46 |
| 82 | 0.45 | 0.0150 | 0.42 | 0.95 | 0.02 | 0.01 | 0.40 | 0.95 | 73.64 |

Next, gas-shielded arc welding was performed on the base metal shown in Table 4 below by using each of the flux-cored wires of Examples and Comparative Examples. The remainder of the base metal composition shown in Table 4 are Fe and unavoidable impurities.

TABLE 4

| Base metal | Sheet Thickness (mm) | Component Composition (mass %) | | | | |
|---|---|---|---|---|---|---|
| | | C | Si | Mn | P | S |
| JIS G 3106 SM490A | 20 | 0.14 | 0.18 | 1.08 | 0.01 | 0.001 |

The welding conditions are as follows.
Shielding gas: 80 vol % Ar-20 vol % CO$_2$, 25 liters/min
Wire diameter: 1.2 mmφ
Welding position: flat
Groove shape: 20° V
Groove gap: 16 mm
Welding current: 280 A
Arc voltage: 29 V
Welding speed: 350 mm/min With respect to the weld metal obtained by gas-shielded arc welding using each of the flux-cored wires of Examples and Comparative Examples, the mechanical properties and the blow-hole resistance (defect resistance) were evaluated by the following methods.

<Mechanical Properties>

The mechanical properties of the weld metal were evaluated by the tensile test and impact test in conformity with "Methods for Tensile and Impact Tests of Weld Metal" specified in JIS Z 3111:2005. The low-temperature toughness was judged as Passed when the impact value at −80° C. (CVN-80) was 42.0 J or more and the impact value at −50° C. (CVN-50) was 47.0 J or more. The 0.2% yield strength (0.2% PS) was judged as Passed when it was 500 MPa or more. Furthermore, the tensile strength (TS) was judged as Passed when it was from 580 to 760 MPa.

<Blow-hole Resistance>

The blow-hole resistance was evaluated by Radiographic Examination of JIS Z 3104:1995 after removing excessive weld metal and backing metal of a weld metal specimen. The specimen was rated A when a blow hole was not generated in a weld length of 300 mm, rated B when blow holes of less than 3 mm were generated in the range of 1 or more and 3 or less in terms of Number, and rated C when blow holes of less than 3 mm were generated in the range of more than 3 in terms of Number or blow holes of 3 mm or more were generated, and those rated A or B were judged as Passed.

With respect to each of the flux-cored wires of Examples and Comparative Examples, the diffusible hydrogen content (cold cracking resistance) and the hot cracking resistance were evaluated by the following methods.

<Diffusible Hydrogen Content>

The diffusible hydrogen content in the weld metal was evaluated by the method in conformity with JIS Z 3118:2007. The base metal used is shown in Table 4. Those where the diffusible hydrogen content ([H]d) was 5.0 ml/100 g or less were judged as Passed.

<Hot Cracking Resistance>

The hot cracking resistance was evaluated based on "Method of FISCO test" specified in JIS Z 3155:1993. The base metal used is shown in Table 4. The hot cracking resistance was rated A when the cracking rate was 0%, rated B when the cracking rate was more than 0% and less than 10%, and rated C when the cracking rate was 10% or more. Those rated C were judged as impracticable, and those rated A and B were judged as Passed.

In the test of hot cracking resistance, the welding conditions were as follows.

Shielding gas: 80 vol % Ar-20 vol % $CO_2$, 25 liters/min
Wire diameter: 1.2 mmφ
Welding position: flat
Groove shape: 90° Y
Groove gap: 4 mm
Welding current: 200 A
Arc voltage: 20 V
Welding speed: 200 mm/min Adjustment of the particle size of Ni and measurement of the particle size were performed as follows.

(Method for Adjusting Particle Size of Ni)

Adjustment of the particle size of Ni was performed by the following method.

A Ni raw material in which the content of a particle having a particle diameter of 106 μm or less was adjusted to be 15 mass % or more and 55 mass % or less and the content of a particle of more than 106 μm was adjusted to be 45 mass % or more and 85 mass % or less, relative to the total mass of the Ni raw material, was used. This Ni raw material was added in an amount 0.1 mass % or more and 5.0 mass % or less relative to the total mass of the wire. Then, as illustrated in (c)→(d) of FIG. 1, the inside of a steel outer sheath 1 was filled with flux 2 containing Ni and after forming the steel outer sheath 1 such that the flux was enclosed inside the steel outer sheath 1, the wire was drawn as illustrated in (d)→(e) of FIG. 1. The formed wire was drawn from a wire diameter of 5.0 mmφ to 1.2 mmφ, whereby the Ni particle size distribution of the flux enclosed in the flux-cored wire after drawing was adjusted to fall within the specific range.

(Method for Measuring Particle Size of Ni)

The particle size of Ni was measured by the following method.

Flux was collected from the flux-cored wire after drawing and separated by a sieve having an opening of 106 μm in conformity with JIS Z 8801-1:2006 into (1) a flux component having a particle diameter of 106 μm or less and (2) a flux component having a particle diameter of more than 106 μm by using RPS-105 manufactured by Seishin Enterprise Co., Ltd. As the sieving conditions, a sound wave frequency was 80 Hz, a pulse interval was 1 second, and a classification time was 2 minutes. The content of Ni having a particle size of 106 μm or less and the content of Ni having a particle size of more than 106 μm were thereby measured, and the particle size ratio was calculated from those flux components separated.

With respect to each of the flux-cored wires of Examples and Comparative Examples, the welding workability was evaluated by the following method.

<Welding Workability>

The welding workability was evaluated as follows by performing vertical up fillet welding on the base metal shown in Table 4. The welding workability was rated A when the height of the convex part was less than 2 mm relative to a smooth fillet bead, rated B when the height of the convex part was 2 mm or more and less than 3 mm, and rated C when the height of the convex part was 3 mm or more, when slag or molten metal dripped and welding could not be performed, or when the bead surface took on a concave shape, and those rated A and B were judged as Passed.

In the test of welding workability, the welding conditions were as follows.

Shielding gas: 80 vol % Ar-20 vol % $CO_2$, 25 liters/min
Wire diameter: 1.2 mmφ
Groove gap: 0 mm
Welding current: 220 A
Arc voltage: 24 V
Welding speed: 150 mm/min
Weaving width: 10 mm The results of these evaluations are shown together in Tables 5 and 6. In Tables 5 and 6, as for those not satisfying the evaluation criteria on the mechanical properties and the diffusible hydrogen content, the numerical value is indicated by underlining.

TABLE 5

| No. | CVN-80 (J) | CVN-50 (J) | 0.2% PS (MPa) | TS (MPa) | [H]d (ml/100 g) | Workability VUF | Hot Cracking (FISCO cracking) | X-Ray (Blow hole) |
|---|---|---|---|---|---|---|---|---|
| 1 | 97.0 | 116.0 | 518 | 606 | 3.4 | A | A | A |
| 2 | 48.0 | 72.0 | 663 | 739 | 3.9 | A | A | A |
| 3 | 54.0 | 84.0 | 611 | 670 | 3.3 | A | A | A |
| 4 | 55.0 | 49.0 | 515 | 588 | 4.0 | B | B | B |
| 5 | 48.0 | 58.0 | 524 | 598 | 4.5 | B | B | B |
| 6 | 45.0 | 50.0 | 589 | 740 | 3.5 | A | A | A |
| 7 | 65.0 | 75.0 | 590 | 760 | 2.9 | A | B | A |
| 8 | 61.0 | 72.6 | 532 | 665 | 4.9 | A | A | A |
| 9 | 70.0 | 80.0 | 519 | 680 | 3.5 | B | A | A |
| 10 | 42.0 | 48.0 | 604 | 756 | 3.5 | A | A | A |
| 11 | 90.0 | 125.0 | 502 | 589 | 3.9 | A | A | A |
| 12 | 55.0 | 72.0 | 533 | 645 | 3.1 | A | B | A |
| 13 | 65.0 | 79.0 | 554 | 672 | 3.0 | A | A | A |
| 14 | 58.0 | 78.0 | 536 | 658 | 3.5 | A | B | A |
| 15 | 64.0 | 75.0 | 547 | 664 | 2.9 | A | A | A |
| 16 | 43.0 | 49.0 | 630 | 758 | 2.8 | A | A | A |
| 17 | 68.0 | 80.0 | 539 | 650 | 3.2 | A | A | B |
| 18 | 58.0 | 77.0 | 537 | 644 | 2.9 | A | B | A |
| 19 | 42.0 | 48.0 | 605 | 760 | 2.8 | A | A | A |

TABLE 5-continued

| No. | CVN-80 (J) | CVN-50 (J) | 0.2% PS (MPa) | TS (MPa) | [H]d (ml/100 g) | Workability VUF | Hot Cracking (FISCO cracking) | X-Ray (Blow hole) |
|---|---|---|---|---|---|---|---|---|
| 20 | 45.0 | 52.0 | 600 | 740 | 3.4 | A | A | A |
| 21 | 85.0 | 120.0 | 555 | 629 | 2.1 | B | A | A |
| 22 | 62.0 | 50.0 | 629 | 655 | 3.0 | A | A | A |
| 23 | 69.0 | 79.0 | 539 | 648 | 3.2 | A | A | A |
| 24 | 78.0 | 89.0 | 577 | 645 | 3.0 | A | A | A |
| 25 | 98.0 | 108.0 | 525 | 618 | 3.0 | A | A | A |
| 26 | 69.0 | 98.0 | 589 | 688 | 2.9 | A | A | A |
| 27 | 99.0 | 118.0 | 588 | 641 | 3.6 | A | A | A |
| 28 | 87.0 | 96.0 | 566 | 631 | 3.2 | A | A | A |
| 29 | 91.0 | 112.0 | 599 | 685 | 2.6 | A | A | A |
| 30 | 65.0 | 66.0 | 650 | 759 | 3.5 | A | A | A |
| 31 | 46.0 | 49.0 | 554 | 650 | 2.2 | A | A | A |
| 32 | 55.0 | 61.0 | 668 | 745 | 1.2 | A | A | A |
| 33 | 98.0 | 88.0 | 525 | 664 | 2.8 | A | A | A |
| 34 | 92.0 | 102.0 | 527 | 618 | 3.0 | A | A | A |
| 35 | 86.0 | 89.0 | 608 | 725 | 3.3 | A | A | A |
| 36 | 98.0 | 111.0 | 511 | 609 | 2.5 | A | A | A |
| 37 | 99.0 | 108.0 | 519 | 608 | 2.5 | A | A | A |
| 38 | 85.0 | 102.0 | 520 | 619 | 4.8 | A | A | A |
| 39 | 88.0 | 119.0 | 543 | 629 | 3.6 | B | A | A |
| 40 | 86.0 | 98.0 | 591 | 704 | 3.3 | A | A | A |
| 41 | 75.0 | 88.0 | 590 | 690 | 2.9 | A | A | A |
| 42 | 89.0 | 98.0 | 615 | 708 | 2.9 | A | A | A |

TABLE 6

| No. | CVN-80 (J) | CVN-50 (J) | 0.2% PS (MPa) | TS (MPa) | [H]d (ml/100 g) | Workability VUF | Hot Cracking (FISCO cracking) | X-Ray (Blow hole) |
|---|---|---|---|---|---|---|---|---|
| 43 | 80.0 | 91.0 | 660 | 725 | 3.5 | A | A | A |
| 44 | 88.0 | 97.0 | 630 | 715 | 2.4 | A | A | A |
| 45 | 98.0 | 115.0 | 554 | 678 | 2.6 | A | A | A |
| 46 | 75.0 | 94.0 | 548 | 699 | 3.3 | A | A | A |
| 47 | 77.0 | 98.0 | 512 | 604 | 2.8 | A | A | A |
| 48 | 74.0 | 85.0 | 515 | 615 | 3.0 | A | A | A |
| 49 | 58.0 | 66.0 | 554 | 646 | 2.7 | A | A | A |
| 50 | 38.0 | 41.0 | 599 | 754 | 8.2 | A | A | A |
| 51 | 64.0 | 59.0 | 604 | 758 | 3.1 | A | C | A |
| 52 | 29.0 | 33.0 | 658 | 758 | 2.2 | A | A | A |
| 53 | 91.0 | 122.0 | 489 | 584 | 3.2 | A | A | A |
| 54 | 54.0 | 77.0 | 546 | 646 | 3.3 | A | C | A |
| 55 | 58.0 | 97.0 | 568 | 658 | 3.7 | A | C | A |
| 56 | 43.0 | 50.0 | 609 | 801 | 3.5 | A | A | A |
| 57 | 40.0 | 41.0 | 495 | 575 | 3.2 | A | A | C |
| 58 | 59.0 | 86.0 | 539 | 646 | 3.8 | A | C | A |
| 59 | 41.0 | 43.0 | 647 | 758 | 3.3 | A | A | A |
| 60 | 33.0 | 40.0 | 664 | 750 | 2.6 | A | A | A |
| 61 | 85.0 | 110.0 | 548 | 678 | 3.4 | C | A | A |
| 62 | 38.5 | 40.5 | 610 | 750 | 8.6 | A | A | A |
| 63 | 55.0 | 60.0 | 629 | 755 | 3.0 | A | A | A |
| 64 | 69.0 | 79.0 | 539 | 648 | 3.2 | A | A | B |
| 65 | 50.0 | 58.0 | 701 | 759 | 3.0 | A | A | A |
| 66 | 53.0 | 58.0 | 699 | 749 | 2.9 | A | B | A |
| 67 | 50.0 | 55.0 | 566 | 631 | 3.2 | A | A | A |
| 68 | 65.0 | 66.0 | 650 | 759 | 3.5 | A | A | A |
| 69 | 46.0 | 49.0 | 554 | 650 | 2.2 | A | A | A |
| 70 | 55.0 | 61.0 | 668 | 745 | 1.2 | A | A | A |
| 71 | 92.0 | 102.0 | 527 | 618 | 3.0 | A | B | A |
| 72 | 45.0 | 53.0 | 608 | 725 | 3.3 | A | A | A |
| 73 | 98.0 | 111.0 | 511 | 609 | 4.9 | A | A | A |
| 74 | 99.0 | 108.0 | 519 | 608 | 5.0 | A | A | A |
| 75 | 85.0 | 102.0 | 520 | 619 | 4.8 | A | A | A |
| 76 | 88.0 | 119.0 | 543 | 629 | 3.6 | B | A | A |
| 77 | 43.0 | 50.0 | 591 | 704 | 3.3 | A | A | A |
| 78 | 43.0 | 56.0 | 615 | 708 | 2.9 | A | A | A |
| 79 | 88.0 | 97.0 | 630 | 715 | 2.4 | B | A | A |
| 80 | 75.0 | 94.0 | 548 | 699 | 3.3 | B | A | A |
| 81 | 77.0 | 98.0 | 512 | 604 | 2.8 | B | A | A |
| 82 | 74.0 | 85.0 | 515 | 615 | 3.0 | A | A | A |

As shown in Tables 5 and 6, in No. 1 to No. 49 and No. 63 to No. 82 satisfying the ranges of the present invention, the judgments were rated as Passed.

On the other hand, in No. 50 to No. 62 not satisfying the ranges of the present invention, the judgment results were as follows.

In No. 50 where the particle size ratio of Ni exceeded the upper limit, the toughness was poor and the diffusible hydrogen content was large.

In No. 51 where the particle size ratio of Ni was less than the lower limit, hot cracking occurred In No. 52 where the C content exceeded the upper limit, the toughness was poor.

In No. 53 where the C content was less than the lower limit, the yield strength was reduced.

In No. 54 where the P content exceeded the upper limit, hot cracking occurred.

In No. 55 where the S content exceeded the upper limit, hot cracking occurred.

In No. 56 where the Mn content exceeded the upper limit, the tensile strength was excessively increased.

In No. 57 where the Mn content was less than the lower limit, the toughness was poor, the strength was reduced, and blow holes were generated.

In No. 58 where the Ni content exceeded the upper limit, the hot cracking occurred.

In No. 59 where the Ni content was less than the lower limit, the toughness was poor.

In No. 60 where the $TiO_2$ content exceeded the upper limit, the toughness was poor.

In No. 61 where the $TiO_2$ content was less than the lower limit, a convex bead was formed, and the welding workability was poor.

In No. 62 where the particle size ratio of Ni exceeded the upper limit, the toughness was poor and the diffusible hydrogen content was large.

The flux-cored wire of No. 62 assumes the conventional flux-cored wire described in Patent Document 1. As described in the Examples, the conventional flux-cored wire does not satisfy a certain level in the evaluations above. Thus, the Examples objectively demonstrate superiority of the flux-cored wire according to the present invention compared with the conventional flux-cored wire.

While the invention has been described in detail with reference to embodiments and Examples thereof, the gist of the present invention is not limited to the contents described above, and the scope of right thereof should be construed broadly based on the scope of claims. It goes without saying that changes, modifications, etc. to the contents of the present invention can be widely made based on the matters described above.

While the present invention has been described in detail and with reference to specific embodiments thereof, it will be apparent to one skilled in the art that various changes and modifications can be made therein without departing from the spirit and scope thereof.

This application is based on Japanese Patent Application No. 2015-169350 filed on Aug. 28, 2017, the entire subject matters of which are incorporated herein by reference.

INDUSTRIAL APPLICABILITY

The flux-cored wire for gas-shielded arc welding of the present invention is useful particularly for the field of offshore structures or line pipes.

DESCRIPTION OF REFERENCE NUMERALS AND SIGNS

1 Steel outer sheath
2 Flux
10 Flux-cored wire

The invention claimed is:

1. A flux-cored wire for gas-shielded arc welding, which has a steel outer sheath filled with a flux, the flux-cored wire comprising, relative to a total mass of the wire:
C: 0.01 mass % or more and 0.20 mass % or less;
Mn: 0.5 mass % or more and 5.0 mass % or less;
$TiO_2$: 2.0 mass % or more and 10.0 mass % or less;
P: 0.050 mass % or less;
S: 0.050 mass % or less,
wherein:
the flux comprises:
Ni particles having a particle size of 106 μm or less;
Ni particles having a particle size of more than 106 μm; and
from 0.10 mass % or more and 5.00 mass % or less of Ni, relative to the total mass of the wire,
wherein a value of a ratio $\alpha 1/\alpha 2$ is 0.50 or more and 1.00 or less, wherein $\alpha 1$ (mass %) is a content of the Ni particles having a particle size of 106 μm or less relative to the total mass of the wire, and $\alpha 2$ (mass %) is a content of the Ni particles having a particle size of more than 106 μm relative to the total mass of the wire.

2. The flux-cored wire for gas-shielded arc welding according to claim 1, further comprising, relative to the total mass of the wire, at least one of Si and an Si oxide: 0.05 mass % or more and 1.00 mass % or less in total in terms of Si.

3. The flux-cored wire for gas-shielded arc welding according to claim 1, further comprising, relative to the total mass of the wire, at least one of Cr: 0.50 mass % or less, Cu: 0.50 mass % or less, and Mo: 0.50 mass % or less.

4. The flux-cored wire for gas-shielded arc welding according to claim 1, further comprising, relative to the total mass of the wire, metal Mg and an Mg alloy: 0.10 mass % or more and 1.20 mass % or less in total in terms of Mg.

5. The flux-cored wire for gas-shielded arc welding according to claim 1, further comprising, relative to the total mass of the wire, metal Ti and a Ti alloy: 0.80 mass % or less in total in terms of Ti.

6. The flux-cored wire for gas-shielded arc welding according to claim 1, further comprising, relative to the total mass of the wire, B and a B compound: 0.0010 mass % or more and 0.0200 mass % or less in total in terms of B.

7. The flux-cored wire for gas-shielded arc welding according to claim 1, further comprising, relative to the total mass of the wire, an F compound: 0.01 mass % or more and 0.50 mass % or less in total in terms of F, and a sum of a total in terms of Na of an Na compound and a total in terms of K of a K compound: 0.01 mass % or more and 1.00 mass % or less.

8. The flux-cored wire for gas-shielded arc welding according to claim 1, further comprising, relative to the total mass of the wire, at least one of Nb: 0.10 mass % or less and V: 0.10 mass % or less.

9. The flux-cored wire for gas-shielded arc welding according to claim 1, further comprising, relative to the total mass of the wire, $ZrO_2$: 0.50 mass % or less and $Al_2O_3$: 0.05 mass % or more and 1.00 mass % or less.

10. The flux-cored wire for gas-shielded arc welding according to claim 1, further comprising, relative to the total mass of the wire, Fe: 75.00 mass % or more.

* * * * *